Aug. 21, 1962    J. R. WALL ETAL    3,049,730
SEAT STRUCTURE

Filed Dec. 3, 1959    4 Sheets-Sheet 1

INVENTORS
James R. Wall
Edward P. Harris
BY
Their Attorney

Aug. 21, 1962  J. R. WALL ETAL  3,049,730
SEAT STRUCTURE
Filed Dec. 3, 1959  4 Sheets-Sheet 2
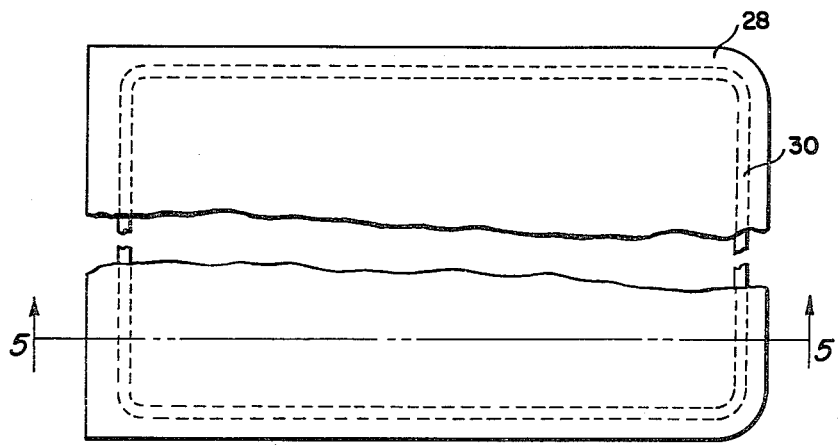
Fig. 4
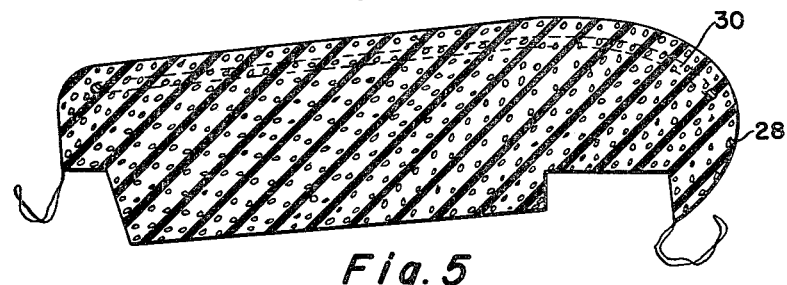
Fig. 5
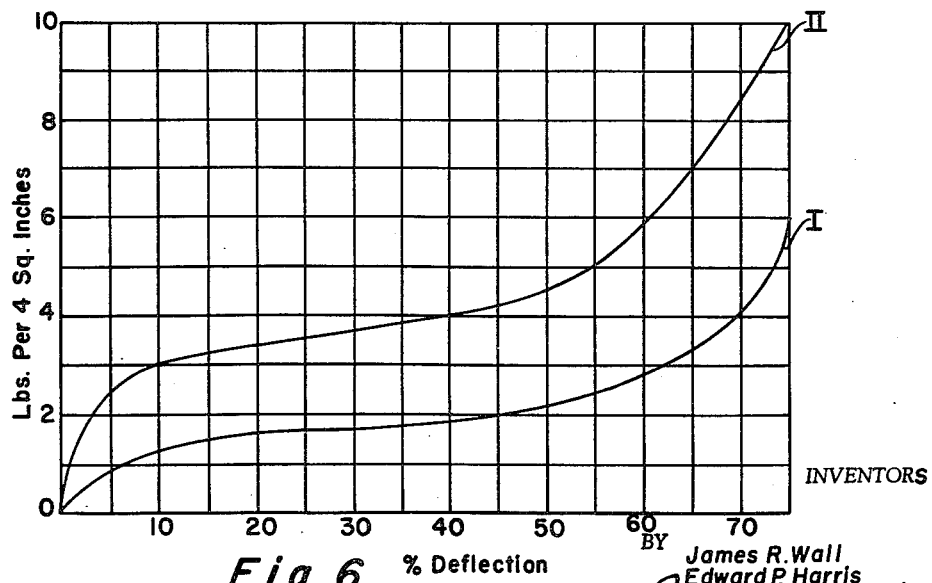
Fig. 6  % Deflection
INVENTORS
James R. Wall
Edward P. Harris
BY
Their Attorney Aug. 21, 1962 J. R. WALL ETAL 3,049,730
SEAT STRUCTURE
Filed Dec. 3, 1959 4 Sheets-Sheet 4

INVENTORS
James R. Wall
BY Edward P. Harris
John T. Mann
Their Attorney

United States Patent Office 3,049,730
Patented Aug. 21, 1962

3,049,730
SEAT STRUCTURE
James R. Wall and Edward P. Harris, Dayton, Ohio, assignors to General Motors Corporation, Detroit, Mich., a corporation of Delaware
Filed Dec. 3, 1959, Ser. No. 856,989
3 Claims. (Cl. 5—351)

This invention relates to seat construction and more particularly to vehicular seat construction utilizing foamed elastomers as a cushioning and shock absorbing agent.

This is a continuation-in-part of the copending U.S. parent application Serial No. 672,650 filed July 18, 1957, now Patent 2,980,167, Harris et al., issued April 18, 1961.

In conventional seat construction, particularly automobile seat construction, it is common practice to provide an upper or topper pad of sufficient thickness to provide a pleasing "feel" and/or "rideability" which is supported by a plurality of coil springs or other metal spring members for absorbing shock incident to riding over rough roads or to the seat occupant seating heavily in the seat. Since metal springs have load-deflection characteristics wherein the load bears a substantially linear relationship to the deflection in accordance with Hooke's law, within the operating range of these members, these seat constructions are relatively lively and react to cause the seat occupant to be thrown about when riding over relatively severe road bumps and the like.

It is an object of this invention to provide an efficient, economical and relatively simple seat construction wherein the load-deflection characteristics may readily be varied in the manufacture thereof which comprises a plurality of layers of resilient and relatively elastic polyurethane foam, each layer having a different hardness or load-deflection characteristics.

It is a further object of this invention to provide a seat construction wherein a polyurethane foamed cushion which is relatively soft is supported by a second cushion of polyurethane foam which is relatively hard to provide improved dampening and stability. Yet another object of the invention is to provide a polyurethane foam seat cushion of improved stability which includes a rigid reinforcing member embedded therein in the near vicinity of the upper edges thereof.

Another object of this invention is to provide a seat construction using a preformed covering of plastic material relative to which a foam such as polyurethane is provided as a filling wherein spring means are set at least in part prior to curing or hardening of the foam that alone holds the spring means in place.

Still a further object of this invention is to provide a seat assembly in one package including a covering of vacuum-formed, grained vinyl-type material having a seat contour with depressions for cloth insert, beaded effects, simulated buttons and the like such that the vinyl-type covering provides resistance to tearing and tear propagation as well as good adhesion of urethane foam of a thickness ranging between two and three inches directly underneath the covering and directly to at least a portion of spring means having a configuration such as zig-zag, coil and the like embedded in a depth such as ¼ inch in the foam which has high tensile strength and relative to which small holes can be provided in the covering for breathability in predetermined areas.

Another object of this invention is to provide a seat construction in a unitary package using a preformed covering of plastic material relative to which a foam such as polyurethane is provided as a filling wherein only center portions of a plurality of zig-zag longitudinally-parallel springs are embedded with opposite ends of the springs free for attachment relative to a seat mounting base with the foam providing sole adhesion both relative to the central portion only of zig-zag springs to maintain longitudinally-parallel alignment thereof and also relative to the preformed plastic covering for increased resistance to tear per se and tear propagation while the covering can have foam-backed depressions for cloth insertion, beaded effects, simulated buttons and the like incorporated therein and maintained in preformed condition by the direct foam backing even, for example, to avoid having the plastic covering take on a deformed set after having a weight thereon for an extended period in hot weather.

Another object of this invention is to provide a polycoil seat construction including a vinyl-like plastic covering vacuum-formed into a predetermined contour and having a urethane foam material as a cushion bonded as a backing thereto and bonded relative to an upper border wire as well as upper ends of a plurality of vertically-positioned coil springs and open-weave cloth embedded in the foam material while median portions of the coil springs are unencumbered and lower ends of the coil springs and the lower border wire are secured together with a burlap-like material and joined thereto by a urethane potting compound.

Further objects and advantages of the present invention will be apparent from the following description, reference being had to the accompanying drawings wherein a preferred embodiment of the invention is clearly shown.

In the drawings:

FIGURE 4 is a top view of a seat construction illustrating another embodiment of the invention.

FIGURE 5 is a cross-sectional view taken along line 5—5 of FIGURE 4.

FIGURE 6 is a graph showing load-deflection curves for relatively hard and soft polyurethane foams utilized in the present invention.

Figure 1:
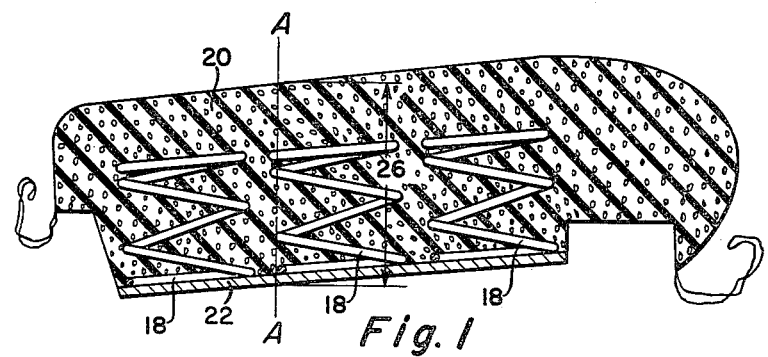
FIGURE 1 is a cross-sectional view of a seat construction suitable for use in an automobile body embodying the present invention.

The invention will now be described in detail with reference to an automobile seat construction although it will be obvious that the invention is applicable to other vehicular seat constructions and to household furniture such as davenports, couches, chairs and the like.

Elastomeric foam materials which are particularly useful in carrying out the present invention are the polyurethane foams having a density ranging from about 1–10 lbs. per cubic ft. These foams may be formed by reacting a wide variety of polymeric materials such as polyesters, polyesteramides, polyalkylene glycol, castor oil and other materials having a plurality of reactive hydrogen groups, with organic polyisocyanates, in the presence of accelerators and/or cross-linking agents and/or other addition agents such as plasticizers for modifying the characteristics of the foam. The formation of foamed polyurethane plastics involves a series of complex, physical and chemical reactions in which the evolution of carbon dioxide gas resulting from a reaction of carboxyl and isocyanate groups and/or between water and isocyanate groups causes the foamed or cellular character of these plastics.

Examples of suitable polymeric materials which may be used in the production of suitable foams for use in the present invention are polyesters and polyesteramides such as may be obtained by condensing a variety of polybasic acids, preferably dibasic acids such as adipic, sebacic, phthalic, oxalic, malonic, succinic, maleic, fumaric, itaconic, etc. with polyalcohols such as ethylene glycol, diethylene glycol, glycerol, sorbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used.

Examples of suitable organic polyisocyanates which may be used include aromatic isocyanates such as toluene 2,4 diisocyanate, toluene 2,6 diisocyanate and mixtures thereof, naphthalene 1,5 diisocyanate and M-phenylene diisocyanate, etc. and mixtures of these materials.

Examples of components which may be used for promoting the polyaddition reaction between the above mentioned polymeric materials having free hydrogen reactive groups and the organic polyisocyanates, and providing essential acceleration of the reaction include ethyl ethanolamine, diethyl ethanolamine, pyridine, hexahydro dimethylaniline, methyl piperazine, dimethyl piperazine, tribenzyl amine, N-morpholine, N-methyl morpholine, and N-ethyl morpholine.

A particular feature of the resilient and elastic polyurethane foams utilized in the present invention is their characteristic load-deflection curves illustrated by curve I of FIGURE 6. It will be observed that this curve departs markedly from a substantially linear curve relating to metal springs and rubber in that from the origin to about 15% deflection, the curve is concave downwardly, from about 15% deflection to about 55% deflection, the curve is substantially flat and linear or slightly concave upwardly, and from the latter point the curve becomes relatively steep and concave upwardly. The portion of the curve between about 15 and 55% deflection which may be termed a "plateau" in a curve, illustrates that a seat cushion made of the material is readily deflected in the plateau portion to a large degree by a relatively small increase in load whereby a seat occupant tends to comfortably settle into the seat cushion and shock is effectively absorbed.

Figure 7:
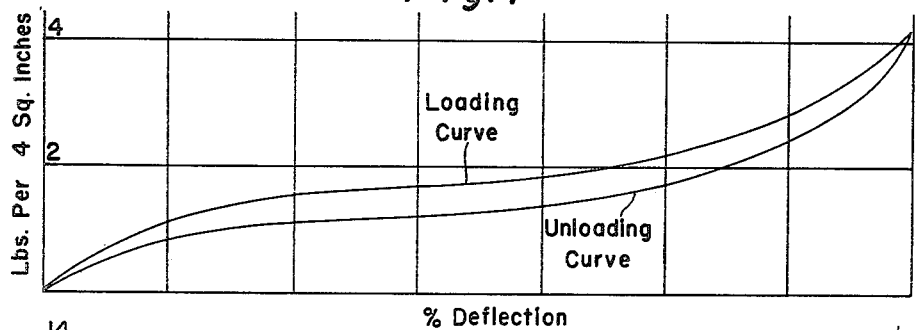
FIGURE 7 is a graph comparing loading and unloading load-deflection curves of the polyurethane foams utilized in the present invention.

Another desirable feature of the polyurethane foams is the hysteresis effect illustrated by the loading and unloading load deflection curves of FIG. 7. It will be noted that these two curves form what may be termed a hysteresis loop. The fact that the loading curve lags the unloading curve indicates that the cushion will not tend to react against a seat occupant or to closely follow the seat occupant in vertical movement with the result that a smoother ride is obtained.

Figure 2:
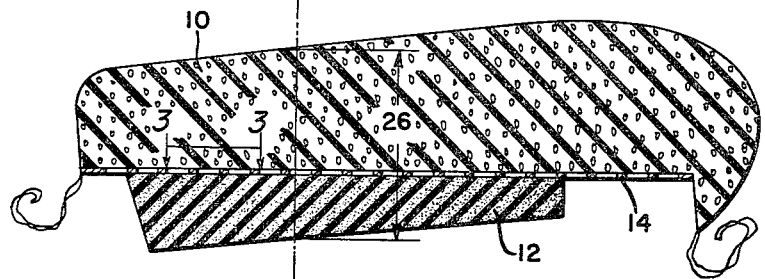
FIGURE 2 is a cross-sectional view of a seat construction illustrating another embodiment of the invention.

In accordance with the present invention as is illustrated in FIGURE 2, a seat construction is provided which includes an upper or topper pad 10 of relatively "soft" polyurethane foam which is supported by a second pad 12 of relatively "hard" polyurethane foam. The terms "hard" and "soft" foam as used herein refer to the relative amount of load necessary to impose on the foam pad to produce a given amount of deflection. Thus a foam which requires a load of 1 lb. per sq. inch to effect a given deflection is termed a soft foam as compared to one which requires a load of 2 lbs. per sq. inch to effect the same deflection. In FIGURE 6, the load-deflection curve I illustrates a suitable soft foam for use as the topper pad 10 and the load-deflection curve II illustrates a suitable hard foam for use as a supporting pad 12.

A soft foam pad having the load-deflection curve I of FIGURE 6, a density of 1.93 lb. per cubic ft. which may be deflected about 3 or 4 inches by a seat occupant of average weight and provides a pleasing seating sensation and hand "feel" may be prepared as follows: A first polymeric ingredient is prepared which is a copolymer of polyoxypropylene glycol and polyoxyethylene glycol and may be described by the formula

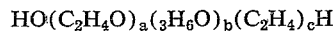

This copolymer may be regarded as ethylene oxide condensed on a polyoxypropylene base wherein the molecular weight of the polyoxypropylene base unit is about 1501 to 1800 and the ethylene oxide in the molecule is from 10–20%. A second polymeric ingredient is prepared which may be described by the following formula:

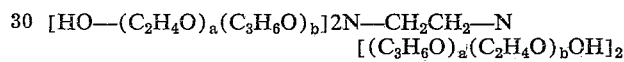

wherein the molecular weight of the polypropylene base is in the range of 2501 to 3000 and the ethylene oxide in the molecule is in the range of from 10–19%. Seventy-five parts by weight of the first described polymeric ingredient and 25 parts by weight of the second described polymeric ingredient are then fully reacted with 43.10 parts of a mixture consisting of 80% 2,4 toluene diisocyanate and 2,6 toluene diisocyanate to which is added 6.80 parts of of didecyl phthalate to produce a prepolymer containing about 9.5% free isocyanate groups. A catalyst component is prepared consisting of 1 part N-methyl morpholine by weight, .3 part triethylamine and 2.6 parts water to which has been added about one-half part of a defoaming agent such as a silicone oil. One hundred parts by weight of the prepolymer components are then mixed with 3.5 parts of the catalyst components and in a few minutes the mixture reacts and sets up to produce the soft polymeric foam.

A hard foam pad having the load-deflection curve II of FIGURE 6 and a density of about 2.3 lbs. per cubic ft. may be prepared as follows: A prepolymer component containing about 9.5% free isocyanate groups is prepared by fully reacting 100 parts by weight of the copolymer of polyoxypropylene glycol and polyoxyethylene glycol described in connection with the above described soft foam composition, 6 parts trimethylol propane and 53 parts of the toluene diisocyanate mixture described above. A catalyst component is prepared containing about 37% N-methyl morpholine and 63% water. One hundred parts of the prepolymer component to which has been added about one-half part of the silicone oil defoaming agent are intimately mixed with 4½ parts of the catalyst component and the mixture reacts and sets up in a few minutes to produce the hard foam.

Figure 8:
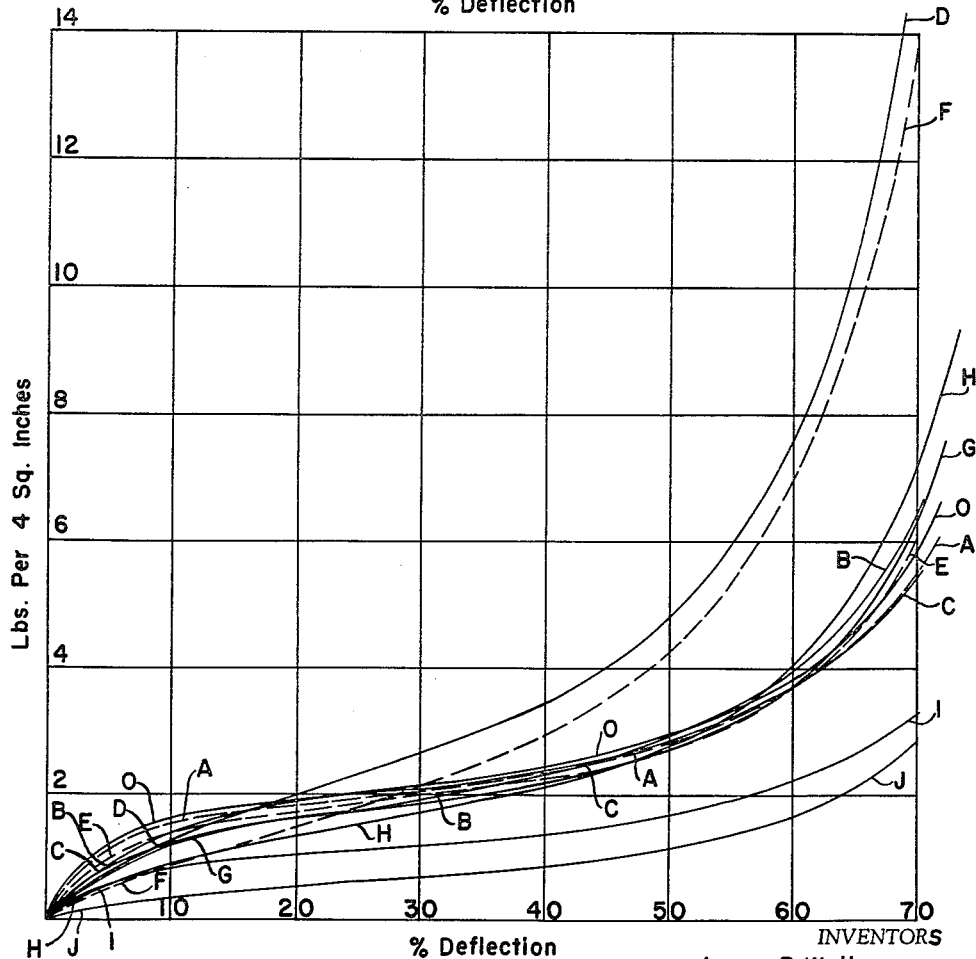
FIGURE 8 is a graph illustrating the effect of various plasticizers on the load-deflection curves of polyurethane foams utilized in the present invention.

As is apparent from the above examples, the relative hardness of the polyurethane foam may be varied by a suitable selection in suitable proportions of the initial foam forming ingredients. It has also been found that the relative hardness of the polyurethane foams may be varied by the inclusion of the plasticizers in predetermined amounts in the foam formulation. FIGURE 8 and the following table illustrate the fact that by adding various plasticizers to the soft foam formulation described in connection with the curve I in FIGURE 6 wherein the didecyl phthalate plasticizer thereof is omitted. The curves shown in FIGURE 8 as well as those shown in FIGURES 6 and 7 were obtained utilizing test samples 1 inch thick. The numerals 1–5 in the chart below correspond to the plasticizers didecyl phthalate, dioctyl sebacate, dibutoxy ethyl phthalate, tricresyl phosphate, polyethylene glycol 400 mono-laurate, respectively.

[Parts by weight]

|         | 1  | 2  | 3  | 4  | 5  |
|---------|----|----|----|----|----|
| Curve O | No plasticizer | | | | |
| Curve A | 10 |    |    |    |    |
| Curve B | 30 |    |    |    |    |
| Curve C |    | 10 |    |    |    |
| Curve D |    | 30 |    |    |    |
| Curve E |    |    | 10 |    |    |
| Curve F |    |    | 30 |    |    |
| Curve G |    |    |    | 10 |    |
| Curve H |    |    |    | 30 |    |
| Curve I |    |    |    |    | 10 |
| Curve J |    |    |    |    | 30 |

It will be noted that a comparison of curve O relating to a formulation involving no plasticizers with the curves A through J, it is apparent that the addition of 10—30 parts of didecyl phthalate and tricresyl phosphate as evidenced by curves D, C, G and H has no appreciable effect on the hardness of the foam, that the addition of 10 parts dioctyl sebacate and 10 parts dibutoxy ethyl phthalate as evidenced by curves C and E has no appreciable effect on the foam but that the addition of 30 parts of the latter as evidenced by curves D and F markedly increase the hardness of the foam, and finally that the addition of 10 parts and 30 parts of polyethylene glycol 400 mono-laurate as evidenced by curves I and J markedly decreases the hardness of the foam. Thus it may be seen that the inclusion of suitable plasticizers in suitable amounts as for example is illustrated by the curves D and J, the relative hardness of the foam may be varied over a wide range.

Figure 3:
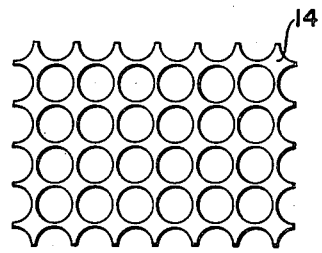
FIGURE 3 is a cross-sectional view of a further embodiment of the invention shown along line 3—3 of FIGURE 2.

In the seat construction shown in FIGURE 2, the pad 10 is preferably first molded and the pad 12 is subsequently molded to the base of the pad 10 to form a unitary and completed seat construction which need only be positioned on a suitable rigid supporting structure (not shown). Desirably the unitary completed seat pad construction may be positioned directly on raised portions of an automobile floor pan formed integrally therewith. The hardness of the composite seat cushion may further be varied by a variation of the thickness of the soft pad 10 relative to the thickness of the hard pad 12, a thinner pad being harder than a thicker one. In the operation of molding the pad 10, a skin is normally formed on the outer surfaces of the pad. The skin on the upper pad 10 and the skin of the lower pad 12 adjacent each other, together function to distribute the weight of the seat occupant over a larger area of the lower pad 12 than the upper pad 10 to prevent undue sinking of the seat occupant into the seat structure, particularly undue penetration due to the impact caused by severe bumps and the like and thereby in effect increase the hardness of the lower pad. The load may be more fully distributed by providing a relatively tough fabric such as a canvas or duck cloth on the underside of the pad 10 adhesively attached thereto which serves as a flexible relative inelastic inner layer between the upper pads 10 and 12 respectively. A weight distributing effect intermediate that produced by the skin described above normally formed in molding the pad 10 and that produced by the aforementioned fabric layer may be obtained by the substitution of a perforated rubber liner 14 as shown in FIGURE 3.

As pointed out above, the presence of the layer intermediate the upper and lower pads serves in effect to increase the hardness of the lower pad. Accordingly, a further variation in hardness of the seat cushion may be obtained by making both the upper and lower pads of a soft character since the intermediate layer will in effect increase the hardness of the lower pad.

In operation, the relatively soft topper pad 10 provides a pleasingly soft seat surface and tends to cushion impact thereon during the normal operation of the motor vehicle. The relatively harder lower pad 12 serves to efficiently absorb relatively heavy impact incident to severe bumps or the like in a manner such that the seat occupant is not exposed to the sensation of "hitting bottom" and the pads do not react so as to throw the seat occupant upwardly as in the case of metal spring pad supporting structures.

As shown in FIGURE 1, a seat structure having layers of different hardness may be formed by metal or embedding coil springs 18 in the lower portion of a single polyurethane foam cushion 20. The springs in this structure in the lower portions of the pad in effect increase the hardness thereof.

It may readily be seen that the seat construction of the present invention lends itself to a wide variation in its performance without markedly changing the basic seat structure so as to suit the personal preference of a customer.

The maximum thickness 26 of the seat construction is dictated largely by space considerations within the car and the minimum thickness by the desired hardness of the foam pads. The present seat construction permits a maximum thickness 26 which is markedly less than the thickness of presently used seats which is of considerable importance in view of the current trend in the direction of lowering the height of automotive vehicles. The soft pad 10 is preferably of a sufficient thickness to permit the seat occupant to comfortably settle into the seat to an extent of 3 to 4 inches particularly in the vicinity of the portion of the seat pad indicated by the plane A—A in FIGURES 1 and 2 representing the plane of the center of gravity of an average seat occupant positioned in the seat. The thickness of the relatively hard pad is sufficient to provide adequate cushioning as is described above. The particular shape of the upper and lower pads, two variations of which are illustrated in FIGURES 1 and 2, is largely a matter of choice depending on the performance desired of the seat cushion construction.

To facilitate turning of and improve lateral stability thereby to some extent, a soft seat cushion 28 as is illustrated in FIGURES 4 and 5 is provided with a stiffening or reinforcing member 30 preferably of rigid material such as metal which is embedded in the soft cushion near the upper edge thereof. Since this reinforcing member "floats" in the foam, it is capable of providing a desirable stiffening of the edges and seat edge firmness without detracting from the shock absorbing capacity of the seat structure.

The seat structure of FIGURE 2 is preferably provided with the edge reinforcing features of FIGURES 4 and 5. The top surface of the seat cushion structure is provided with a suitable cover material such as a suitably attractive fabric or plastic material which is suitably attached to the top surface of the topper pad 10 preferably by molding the material directly against the cover material in the molding operation.

Although the present invention has been disclosed essentially in terms of a construction involving a relatively soft pad supported by a relatively hard pad, it is obvious that the construction may include additional foam pads of varied hardness as well as a topper pad formed of latex foam to further modify the performance of the seat construction.

Figure 9:
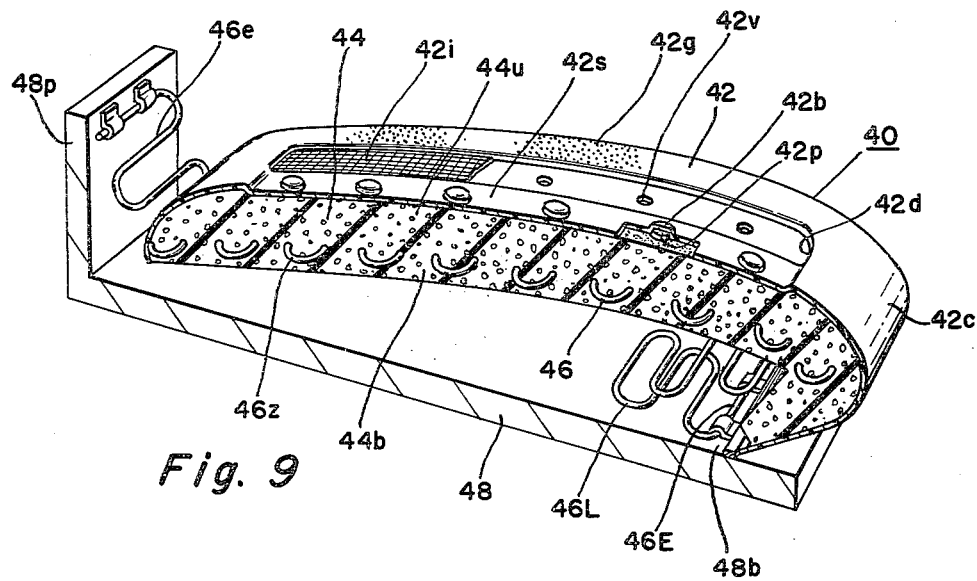
FIGURE 9 is a cross-sectioned perspective view of a modified seat construction embodying the present invention.

A further showing of a seat structure having layers of different hardness as formed by metal or embedding of spring means in a lower portion of a single polyurethane foam cushion is provided in FIGURE 9. The seat construction generally indicated by numeral 40 in FIGURE 9 includes a covering 42 of vacuum-formed, vinyl-type material including a curved end portion 42c and an upper seat portion 42s provided with a curved contour having a downward depression 42d for receiving trim means such as a cloth or fabric insert 42i. The seat portion 42s can include a beaded or grained portion such as 42g as well as upwardly extending pockets or simulated button means 42b. The cloth or fabric insert 42i can be fitted relative to depression 42d and is secured relative to the covering 42 by means of a suitable adhesive material compatible with both the plastic of the covering and yarn of the cloth or fabric insert. The insert can also be made of an artificial or synthetic yarn material such as nylon, Dacron, acrylic fiber and the like and the adhesive material is necessarily compatible with both the insert and covering 42. It is also possible to provide suitable stitching or metal clips such as staples for holding the insert 42 in place relative to the depression 42d. The vinyl-type covering material provides resistance to tearing and tear propagation as well as good adhesion to a pad or cushion means 44 of urethane foam visible in FIGURE 9.

The polyurethane foam padding or cushion means 44 has an upper portion 44u which is relatively soft and has a bottom portion 44b with an increased hardness due to provision of a spring means generally indicated by numeral 46 with one completely free end 46e being provided without any covering of urethane foam material and adapted for attachment to a seat mounting or base 48 having a panel portion 48p to which end 46e is suitably attached. Clamps or clips can be provided in addition to suitable nuts and bolts for holding the end 46e directly in engagement with the panel portion 48p. An opposite end 46E of each spring means 46 is attached to a bottom portion 48b of the base or mounting 48. This opposite end 46E is also free of any foam material such as 44. Each spring means can include a free loop portion spaced laterally to one side of the foam material 44. This free loop portion is indicated by numeral 46L adjacent to the end 46E. It is to be understood that a plurality of spring means 46 are embedded in a bottom portion 44b of the foam pad 44 and that these springs extend generally longitudinally and parallel relative to each other. Each of the spring means 46 includes a central zigzag portion 46z which is the only part of the spring means totally embedded in the foam material. For example, the urethane foam pad 44 provides a three or four inch backing directly relative to the covering 42 including a pocket 42p of foam that fills space behind simulated button means 42b. Also, a vent aperture or opening 42v can be provided in suitable locations to permit "breathing" or passage of air through the covering 42 as well as possibly the insert means 42i of fabric relative to the foam pad or cushion 44. The spring means 46 are set in the foam pad for a depth such as one-quarter of an inch prior to curing or hardening of the foam in a firm bond relative to both the metal of spring means 46 and an inner periphery of the plastic covering 42. The foam material alone holds the spring means 46 in place relative to the covering 42. The foam material has a high tensile strength and there is good adhesion between the foam and both relative to the central portion only of the zigzag spring to maintain longitudinal and parallel alignment thereof and also relative to the preformed plastic covering for increased resistance to tear per se and tear propagation. This firm adhesion assures return of the covering 42 to an unwrinkled and non-deformed set even after having a weight such as that of a passenger thereon for an extended period in hot weather. Thus, the unitary seat construction or assembly of FIGURE 9 is particularly adapted to take advantage of the characteristics of load-deflection curves illustrated in FIGURE 6 of the drawings. In conjunction with the hysteresis effect of the foam material so far as comfort of a passenger is concerned, there is the added effect of "memory" or return of the urethane foam material to an original shape complementary to the preformed configuration of the covering 42.

It is readily apparent that the seat construction of FIGURE 9 includes basically only three components such as the trim or vacuum-formed covering, the urethane foam pad and the zigzag spring means. Completely avoided and eliminated are about half a dozen previously known components such as a double cotton pad, a burlap foundation separating the pads from wire and insulator adjacent to springs as well as a jute spring silencer and trim tape material. The covering 42 can be vacuum-formed into a predetermined shape on a suitable buck or by forming into a female mold cavity to a seat contour in any suitable mold apparatus. Thickness of the foam pad or layer 44 can vary in a range between 2" and 4" and a completed seat cushion can be taken from a mold following cure ready to attach to a seat mounting. Manual operations of layering of various materials is eliminated. Ends 46e and 46E of the spring means 46 are completely free of foam and are particularly well adapted for attachment relative to a seat mounting or base.

Figure 10:
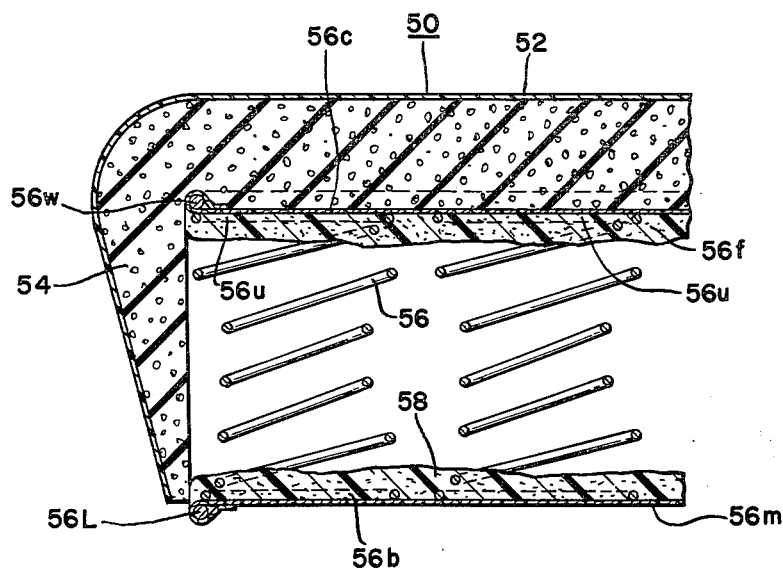
FIGURE 10 is a cross-sectioned elevational view of another embodiment of seat construction involving features in accordance with the present invention.

FIGURE 10 illustrates a poly-coil seat construction generally indicated by numeral 50 and including a preformed vinyl-like plastic covering 52 with an inner peripheral surface to which a urethane foam pad 54 is bonded. Also, embedded in the foam material in addition to at least a portion of spring means 56 there is a border wire means 56w adjacent to upper ends 56u of the springs located on one side of an open weave cloth 56c which is also embedded in the foam along a lateral portion 54f thereof. Bottom ends 56b of each of the coil springs are fitted adjacent to a burlap means 56m which is on top of a lower border wire 56L adapted to fit directly onto a seat mounting or vehicle floor body. The bottom ends 56b of each of the coil springs as well as the burlap means 56m and lower border wire 56L are bonded together by a urethane potting compound indicated by numeral 58. Seat construction in accordance with FIGURE 10 can be made by any suitable method and apparatus or particularly in accordance with a disclosure of copending application Serial No. 823,160—Harris, filed June 26, 1959, and belonging to the assignee of the present invention. The disclosure in this copending application sets forth a very useful and practical procedure for making the seat construction of FIGURE 10 by using a unique apparatus involving method steps set forth in further detail therein. This copending application also provides further details concerning composition of specific materials involved in manufacture of the urethane foam and potting compound referred to in FIGURE 10.

It is to be noted that in the construction of FIGURE 10, the urethane foam material serves as a cushion bonded as a backing relative to the plastic, vacuum-formed covering and also bonded relative to the upper border wire as well as upper ends of a plurality of vertically-positioned coil springs and an open weave cloth embedded in the foam material while median portions of the coil springs are unencumbered and lower ends of the coil springs and a lower border wire are secured together with a burlap-like material and joined thereto by the urethane potting compound.

While the embodiments of the present invention constitute a preferred form, it is to be understood that other forms might be adopted.

What is claimed is as follows:

1. A seat assembly in a unitary package, comprising, a pre-shaped covering of vacuum-formed, grained vinyl-type materials having a seat contour with recess-like inward depressions, cloth insert means fitted over said covering in the depressions, simulated buttons completely integral with said covering and having a cavity therewith on one side thereof, a urethane foam cushion as a filling bonded fully from end to end as well as side to side directly relative to said covering for backing said simulated buttons with respect to each cavity thereof and the depressions to avoid separation and slip therebetween as well as to resist tearing and tear propagation in said covering, and spring means having a zigzag configuration only a central portion of which is adhesively embedded in said foam cushion and having opposite ends also of zigzag configuration completely free of foam so as to be adapted for mounting of the assembly as a unitary package, said spring means along said central embedded portion being in definite bonded relation to said foam cushion for linear modification of non-linear resilient reaction thereof with respect to said covering.

2. The seat assembly of claim 1 wherein said covering has small holes therein located particularly in said depressions covered by said insert means for breathability in predetermined areas and said cushion has a thickness ranging between two and three inches in a lower fraction of which only the central portion of said zigzag spring means is embedded, said covering under urging of said foam cushion as supplanted by said linearly acting spring means having a predetermined shape to which said simulated buttons and depressions are returned due to non-linear reaction of said foam cushion free of any deformed set even after having a weight thereon for an extended period in hot weather.

3. In a seat construction for use in a motor vehicle and having multiple spring means each with a zigzag configuration only a central portion of which is adhesively embedded in a polyurethane foam cushion and with opposite ends also of zigzag configuration completely free of foam so as to be adapted for mounting directly in the vehicle, the improvement which comprises a pre-shaped covering of vacuum-formed and grained vinyl-like material having simulated buttons completely integral with said covering and having a seat contour including recess-like inward depressions fitted with cloth insert means over said covering in the depressions, said covering including said simulated buttons as well as said recess-like inward depressions adhering to the polyurethane foam cushion fully from end to end as well as side to side to avoid separation and slip therebetween though the polyurethane foam cushion in non-linear reaction thereof together with the zigzag spring means embedded therein serve to return said simulated buttons and depressions integral with said covering to be predetermined shape free of any deformed set even after having a weight thereon for an extended period in hot weather, said covering having hidden small holes therein located only particularly in said depressions covered by the cloth insert means for breathability in predetermined areas though foreign material such as dust and dirt is kept from entering the hidden holes.

References Cited in the file of this patent

UNITED STATES PATENTS

| | | |
|---|---|---|
| Re. 24,914 | Koenigsberg | Dec. 20, 1960 |
| 1,843,893 | Becher | Feb. 2, 1932 |
| 2,626,408 | Wesley | Jan. 27, 1953 |
| 2,638,971 | Furman | May 19, 1953 |
| 2,669,294 | Burdick et al. | Feb. 16, 1954 |
| 2,775,287 | Mantegna | Dec. 25, 1956 |
| 2,821,243 | Toulmin | Jan. 28, 1958 |
| 2,874,389 | Koenigsberg | Feb. 24, 1959 |
| 2,882,959 | Burkart | Apr. 21, 1959 |
| 2,892,489 | Hurley | June 30, 1959 |
| 2,897,879 | Brown et al. | Aug. 4, 1959 |

FOREIGN PATENTS

| | | |
|---|---|---|
| 429,326 | France | July 13, 1911 |
| 824,244 | Germany | Dec. 10, 1951 |
| 288,084 | Switzerland | Dec. 31, 1952 |